Jan. 24, 1961 R. H. BODHOLDT 2,969,201

LARGE TAPE REEL ADAPTOR FOR HOME TAPE RECORDERS

Filed April 1, 1958 3 Sheets-Sheet 1

INVENTOR.
ROBERT H. BODHOLDT
BY Herman L. Gordon
ATTORNEY

LARGE TAPE REEL ADAPTOR FOR HOME TAPE RECORDERS

Filed April 1, 1958 3 Sheets-Sheet 2

INVENTOR.
ROBERT H. BODHOLDT
BY Herman L. Gordon
ATTORNEY

LARGE TAPE REEL ADAPTOR FOR HOME TAPE RECORDERS

Filed April 1, 1958 3 Sheets-Sheet 3

INVENTOR.
ROBERT H. BODHOLDT
BY Herman L. Gordon
ATTORNEY

United States Patent Office 2,969,201

Patented Jan. 24, 1961

2,969,201

LARGE TAPE REEL ADAPTOR FOR HOME TAPE RECORDERS

Robert H. Bodholdt, 5705 Colfax Ave., Alexandria, Va.

Filed Apr. 1, 1958, Ser. No. 725,701

3 Claims. (Cl. 242—55.12)

This invention relates to accessories for tape recorders, and more particularly to an attachment for use with a home tape recorder to enable relatively large reels to be employed with the recorder, whereby to provide extended recording and playing time.

A main object of the invention is to provide a novel and improved tape reel attachment for a home tape recorder to enable much larger reels to be employed therewith than those for which the recorder was originally designed, the attachment being simple in construction, being easy to set up for use, and being relatively compact in size.

A further object of the invention is to provide an improved large reel adaptor for a home tape recorder, said adaptor being inexpensive to manufacture, being durable in construction, being reliable in operation, and being mechanically stable.

A still further object of the invention is to provide an improved accessory for a home tape recorder whereby relatively large tape reels of the professional type may be employed in place of the relatively small reels for which the tape recorder was designed, whereby the recording and playing time per reel may be considerably increased, and whereby the tape recorder may be left unattended in operation for relatively long periods of time, as compared with the playing or recording times available with said relatively small reels.

Further objects and advantages of the invention will become apparent from the following description and claims, and from the accompanying drawings, wherein:

Figure 1:
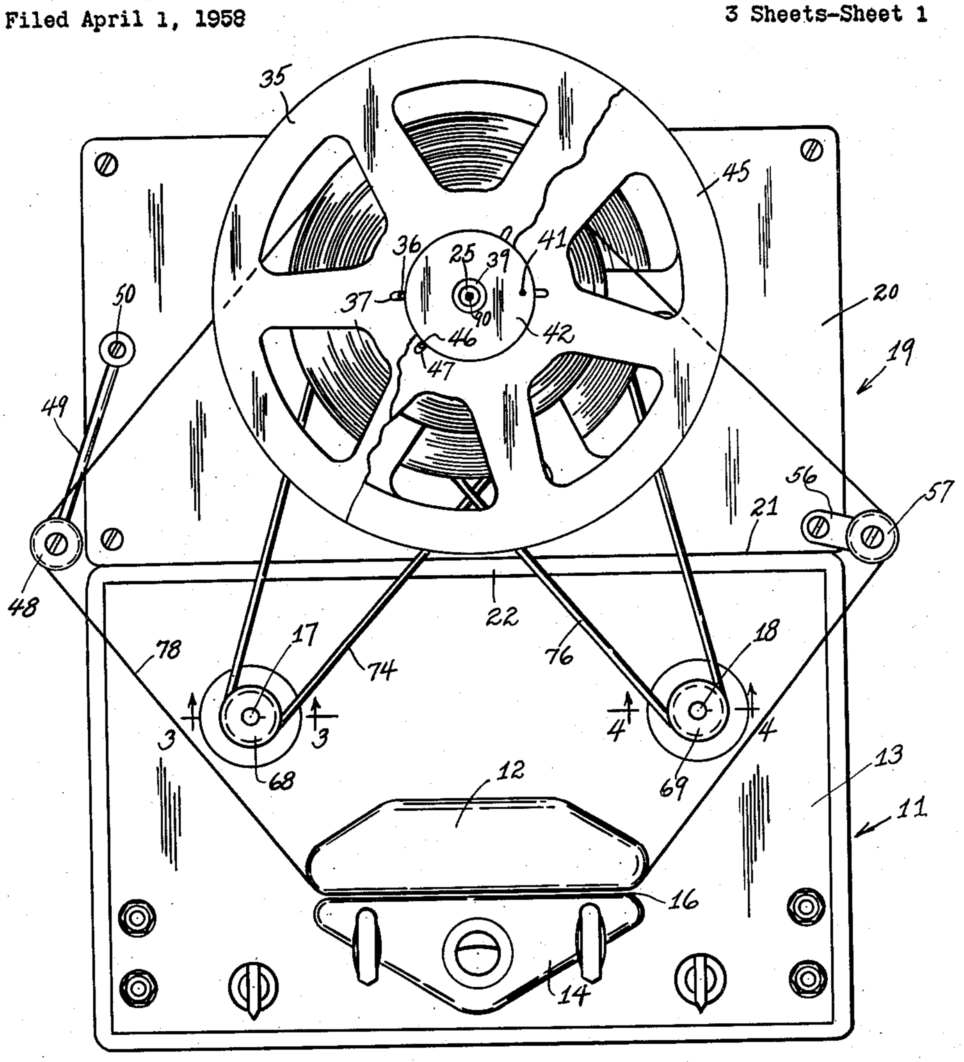
Figure 1 is a fragmentary top plan view showing a tape reel adaptor according to the present invention operatively attached to a home tape recorder.

Conventional home tape recorders are designed to use standard 7-inch reels of magnetic recording tape, and are usually arranged to run the tape at speeds of 7.5 and 3.75 inches per second. As is well understood, the fidelity of recording and reproduction is much better at the higher speed, but the slower speed allows double the recording time for a given reel of tape. Thus, a 7-inch reel comprising 1800 feet of magnetic tape will run for approximately at 1½ hours at a speed of 3.75 inches per second.

It is frequently desirable to operate a tape recorder unattended for a much longer period of time. To meet such requirements heretofore it has been necessary to employ relatively expensive professional equipment designed to accommodate tape reels of the professional type, namely, reels up to 14 inches in diameter, carrying magnetic tape up to lengths of approximately 4800 feet, in the case of standard 1.5 mil tape, and up to 7200 feet in the case of the so-called "extra play" tape, which is approximately 1 mil in thickness. As will be readily apparent, a 7200 foot tape, running at 3.75 inches per second, would provide 6 hours of recording or playing time per track on the tape. With the usual double-track arrangement, 12 hours of material may thus be provided on a 7200 foot reel.

However, the usual home tape recorder cannot accommodate tape reels of the professional type because of space limitations on the tape deck. Accordingly, a prime purpose of the present invention is to provide a simple adaptor enabling the large professional-type tape reels to be employed with a conventional home tape recorder.

Referring now to the drawings, 11 generally designates a conventional home tape recorder including the usual erase-record-playback head assembly contained in a first housing member 12, which is mounted on the tape deck 13 adjacent to a second housing member 14, the housing members 12 and 14 defining a tape guide slot 16 therebetween. A keyed tape feed reel spindle 17 is provided on deck 13 rearwardly and laterally outwardly spaced from housing member 12, and a keyed tape take-up reel spindle 18 is provided on deck 13, rearwardly and laterally outwardly spaced from housing member 12 on the side opposite the feed spindle 17. The spindles 17 and 18 are spaced sufficiently from the respective opposite sides of housing member 12 to receive conventional reels up to 7 inches in diameter.

Figure 2:
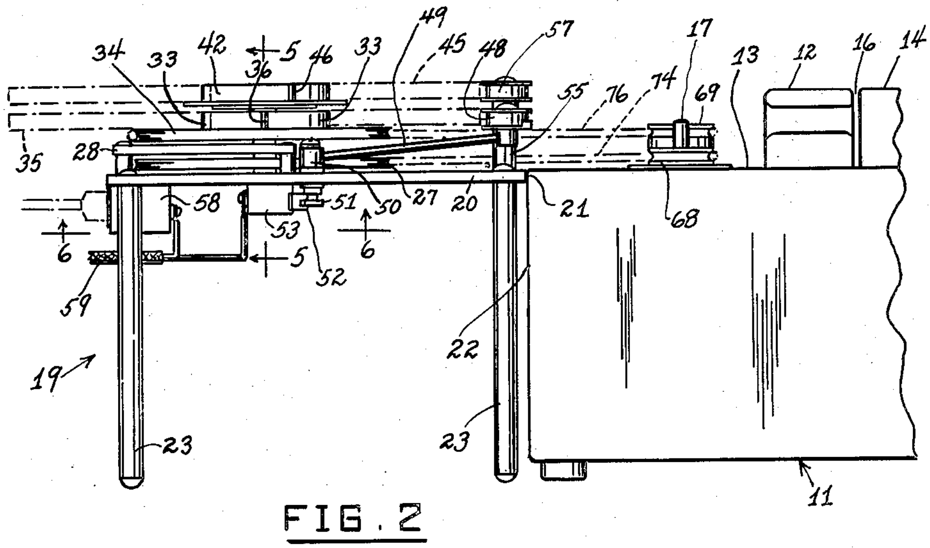
Figure 2 is a fragmentary side elevational view of the structure shown in Figure 1, with the drive belts, tape, and tape reels omitted for clarity, the belts and reels being shown merely in dotted view.

Designated generally at 19 is a large reel adaptor according to this invention. The adaptor 19 comprises a generally rectangular main supporting plate 20 having a straight edge 21 adapted to abut against the rear wall 22 of a conventional home tape recorder 11, the plate 20 being provided at its corners with vertical supporting legs 23 of sufficient height to support plate 20 substantially flush with the tape deck 13, as shown in Figure 2.

Mounted in the intermediate portion of plate 20 at least seven inches from the front edge 21 of said plate is a ball bearing unit 24 in which is journalled a vertical shaft 25. Rigidly secured to shaft 25 and supported on the inner race member 26 of the ball bearing unit is a relatively large, flat, peripherally grooved horizontal pulley 27. Mounted on plate 20 adjacent to and above pulley 27 is an intermediate horizontal plate 28 extending outwardly at opposite sides beyond said pulley and supported in spaced parallel relation to main plate 20 by corner spacer sleeves 29 through which extend the corner fastening bolts 30, rigidly securing plate 28 to main plate 20.

Figure 5:
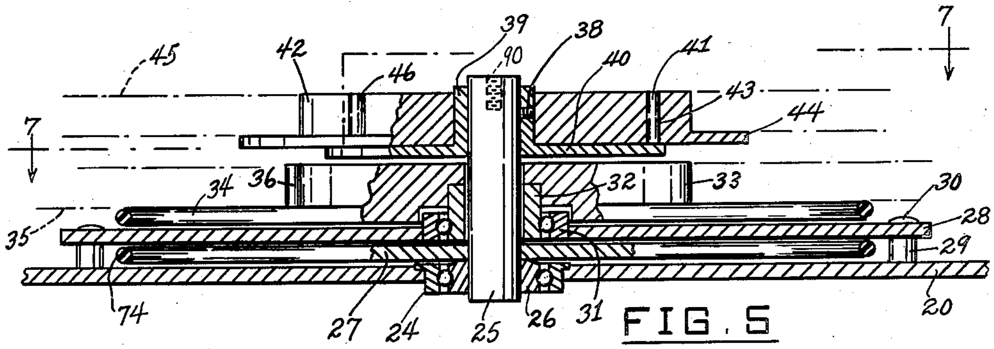
Figure 5 is an enlarged fragmentary cross-sectional view, partly in elevation, taken on line 5—5 of Figure 2.

A second ball bearing unit 31 is mounted in plate 28 in axial alignment with ball bearing unit 24, shaft 25 extending rotatably through the upstanding inner race collar 32 of ball bearing unit 31. Rigidly secured to the upper portion of collar 32 is a reel hub member 33 which is formed at its lower portion with the enlarged, flat peripherally grooved horizontal pulley 34, similar in size to the pulley 27. As shown in Figure 5, the pulley 34 is considerably larger in diameter than hub 33 and defines a support for a large tape reel, as will be presently described.

Hub 33 is dimensioned to receive a large tape reel 35 of the professional type, for example, a 14-inch reel, and is provided at its periphery with a vertical key pin 36 engageable in a keyway 37 of the reel.

As will be seen from Figure 5, the pulleys 27 and 34 are thus journalled for independent rotation relative to each other and relative to main plate 20.

Secured on the upper portion of shaft 25, as by a set screw 38, is a collar member 39 integrally formed at its lower end with an annular flat horizontal flange 40 which is substantially smaller in diameter than hub member 33 and which is vertically spaced a short distance above said hub member. Flange 40 is provided at its peripheral portion with an upstanding vertical pin member 41. Designated at 42 is a second hub member which is removably engaged over collar 39 and which is supported on flange 40. Hub member 42 is formed with a vertical bore 43 which receives the pin member 41, whereby the hub member 42 is keyed to flange 40 and is thus drivingly connected to shaft 25.

Hub member 42 is identical in diameter with hub member 33 and is formed with a bottom peripheral horizontal flange 44 adapted to support a second large tape reel 45 engaged on the hub member 42. Hub member 42 is provided at its periphery with a vertical key pin 46 engageable in a keyway 47 of the second reel 45.

Figure 6:
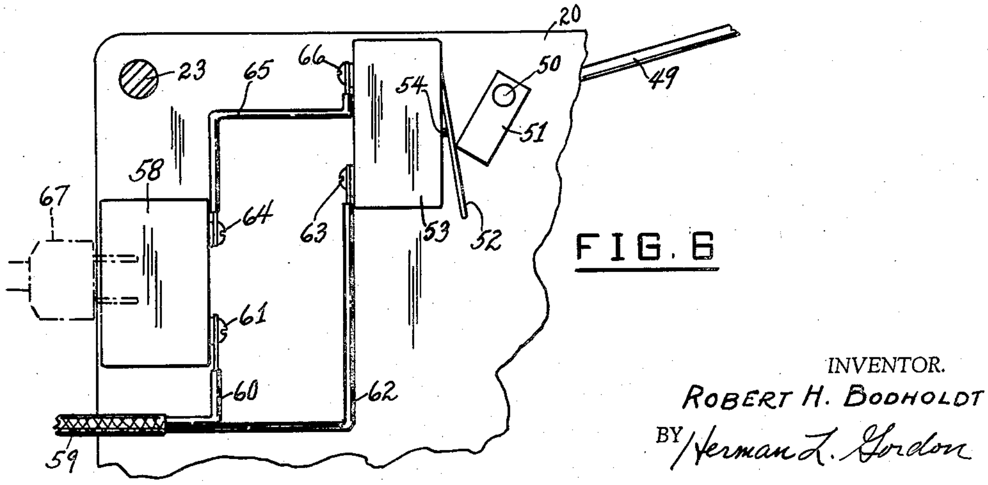
Figure 6 is an enlarged horizontal cross-sectional view taken on line 6—6 of Figure 2.

Designated at 48 is a first tape guide pulley which is rotatably mounted on the end of a switch arm 49 pivoted to the intermediate portion of the left side margin of main plate 20, as viewed in Figure 1. The pivotal connection of arm 49 to plate 20 comprises a vertical stud member 50 extending through and rotatably secured to plate 20, said stud member being rigidly secured to arm 49 and being provided at its lower end with a horizontal arm 51 which engages the operating leaf spring 52 of a microswitch 53 secured to the bottom surface of plate 20, as shown in Figure 6. The microswitch 53 is of the normally open type, and the leaf spring 52 thereof exerts a biasing force on the arm 51 which normally urges arm 49 in a clockwise direction, as viewed in Figure 1. However, under normal conditions of tape tension, as will be presently explained, arm 49 is held so that arm 51 flexes spring 52 inwardly against the operating plunger 54 of the microswitch 53, to maintain the microswitch closed.

Arm 49 is inclined upwardly and forwardly so that the idler pulley 48 is supported substantially at the same height as the lower hub member 33. As shown in Figure 1, pulley 48 is located adjacent the left forward corner of main plate 20.

Secured on the right forward corner of main plate 20 is a vertical post member 55, and secured to the top end of said post member is an outwardly extending arm 56, on the end of which is journalled a second tape guide pulley 57. As shown in Figure 2, the guide pulley 57 is located substantially at the same height as the upper hub member 42.

Secured to the under surface of main plate 20 at a convenient location thereon, for example, subjacent the rear edge of said main plate, is a conventional electrical receptacle 58. A line cord 59 has one conductor 60 thereof connected to one terminal 61 of receptacle 58, as shown in Figure 6. The other conductor 62 is connected to one terminal 63 of microswitch 53. The remaining terminal 64 of receptacle 58 is connected by a conductor 65 to the remaining terminal 66 of the microswitch. The line plug 67 of the tape recorder is plugged into the receptacle 58 so that energization of the tape recorder will be controlled by microswitch 53, as will be presently explained.

Designated at 68 and 69 are respective relatively small drive pulleys which are engageable on the respective reel spindles 17 and 18 of the tape recorder and which are formed with keyways 70 and 71 adapted to drivingly receive the keys 72 and 73 of said spindles. A first drive belt 74 is provided, said drive belt being disposed around the lower large pulley 27 and being engageable in the peripheral groove 75 of drive pulley 68. A second drive belt 76 is provided, said second drive belt engaging around the upper large pulley 34 and being engageable in the peripheral groove of the drive pulley 69, shown at 77.

The drive belts are of suitable length such that they will be maintained under driving tension by the weight of the adaptor assembly when the front edge 21 of main plate 20 is in abutment with the rear wall 22 of the tape recorder, as illustrated in Figure 2, the weight of the adaptor assembly tending to maintain said main plate in a substantially horizontal position with said weight supported on the legs 23, as shown in Figure 2, whereby said front edge abuts said rear wall 22 and acts to oppose the tension in the belts.

The belts 74 and 76 are substantially identical in length in the typical embodiment illustarted herein, for use with a tape recorder wherein the spindles 17 and 18 are spaced equal distances from the rear wall of the tape recorder, as is the usual case.

Figure 3:
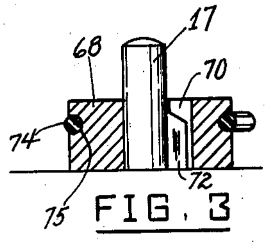
Figure 3 is an enlarged vertical cross-sectional view taken on line 3—3 of Figure 1.
Figure 4:
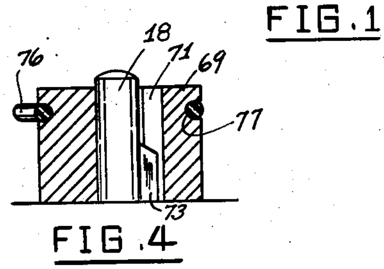
Figure 4 is an enlarged vertical cross-sectional view taken on line 4—4 of Figure 1.

As shown in Figures 3 and 4, the drive pulley 69 is substantially greater in height than the drive pulley 68, and their grooves 77 and 75 are of correspondingly different heights, in accordance with the different heights of their associated reel pulleys 34 and 27.

In using the adaptor 19, the drive pulleys 68 and 69 are engaged on the spindles 17 and 18, and the respective belts 74 and 76 are engaged on the drive pulleys, with the front edge 21 of main plate 20 abutting against the rear wall 22 of the tape recorder, as shown in Figure 1. The tape feed reel 35 is engaged on the hub member 33, after which the hub member 42 is mounted on collar 39 and flange 40 with the pin 41 engaged in the bore 43 of hub member 42. The take-up reel 45 is then mounted on the hub member 42, being supported on the flange 44. The tape, shown at 78, is then threaded around the idler pulley 48, through the guide slot 16, and around the idler pulley 57, being fastened to the take-up reel 45 in the usual manner. Sufficient tension is placed on the tape, as by winding a few turns thereof on the take-up reel 45, to rotate arm 49 to a position closing the microswitch 53. The tape recorder plug 67 is engaged in receptacle 58 and line cord 59 is connected to the power supply, for example, to a wall outlet. Tape recorder 11 may then be operated in its normal manner, whereby the tape will be moved from the supply reel 35 to the take-up reel 45, passing through the guide slot 16 and being regulated in its movement by the tape recorder capstan and the rollers cooperating therewith.

If tape breakage occurs, or if the tape is completely unwound from the supply reel 35, arm 49 is released, allowing leaf spring 52 to unflex, whereby microswitch 53 opens, automatically deenergizing the tape recorder.

Figures 7, 8:
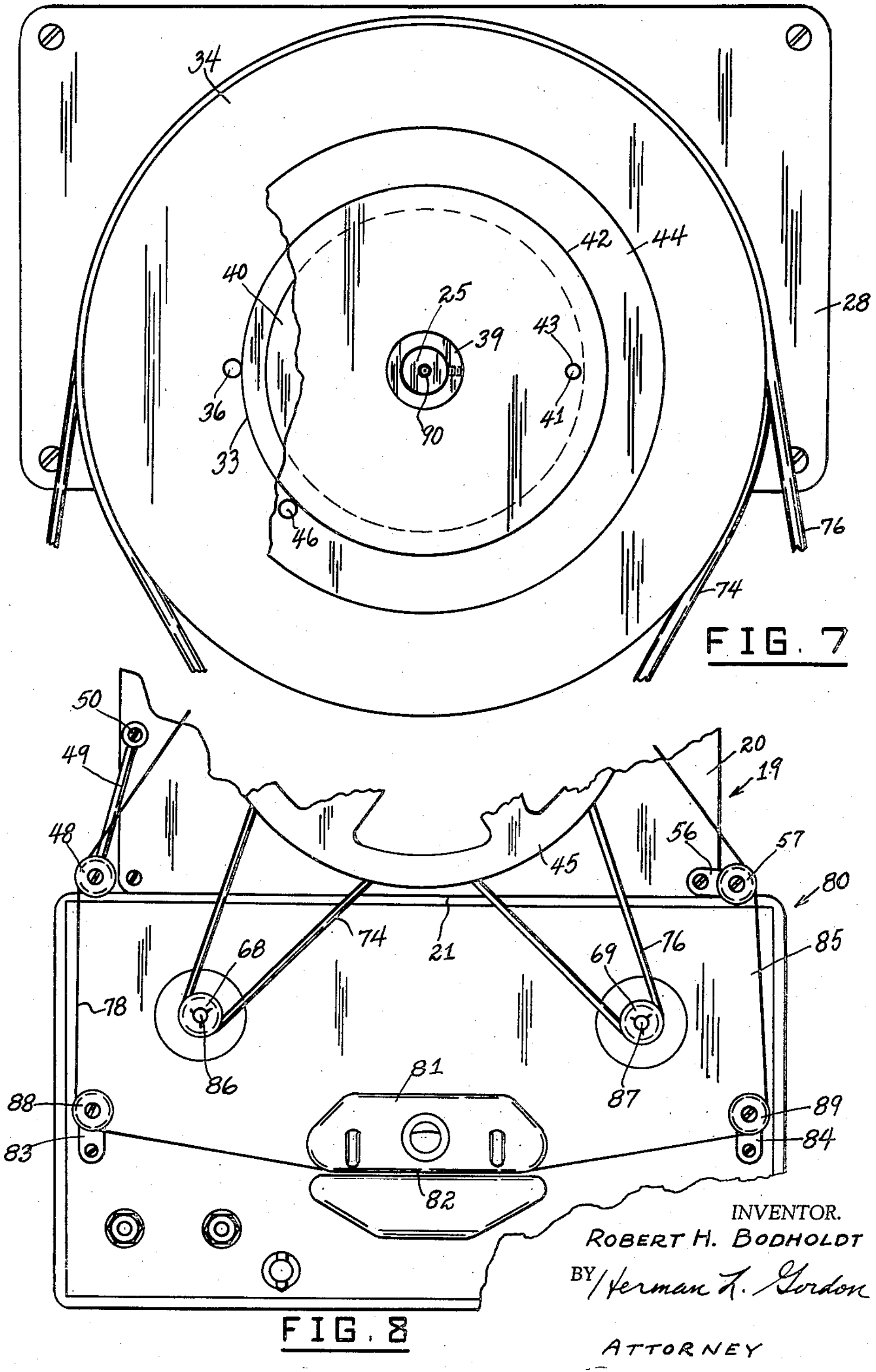
Figure 7 is a horizontal cross-sectional view taken substantially on line 7—7 of Figure 5.
Figure 8 is a fragmentary top plan view illustrating an alternative arrangement whereby the tape reel adaptor of this invention may be employed with a conventional home tape recorder.

With some designs of home tape recorders a situation may arise wherein the tape interferes with the drive pulleys 68 and 69 because of the relative locations of the reel spindles and the recorder head assembly, for example, when the adaptor is employed with a tape recorder of the type shown at 80 in Figure 8. In the case of the tape recorder 80, the head assembly 81 is located so that the tape would engage the drive pulleys 68 and 69 if it extended directly from the idler pulleys 48 and 57 to the guide slot 82 of the head assembly.

To overcome this difficulty, auxiliary bracket members 83 and 84 are mounted on the deck 85 of the tape recorder, said auxiliary bracket members being spaced a sufficient distance laterally and forwardly of the reel spindles 86 and 87 so as not to interfere with the use of normal tape reels on the spindles. Respective auxiliary tape guide pulleys 88 and 89 are journalled on the bracket members 83 and 84, as shown in Figure 8, to guide the tape around the obstructing drive pulleys 68 and 69.

While the adaptor above disclosed has been illustrated and described, by way of example, as employed in conjunction with a tape recorder having a horizontal tape deck, it will be readily understood that the adaptor may be employed in other than a horizontal position. For example, the adaptor may be employed with a tape recorder having a vertical tape deck, the adaptor being supported vertically in any suitable manner with its edge 21 in abutment with the tape recorder and with the pulleys 34 and 27 drivingly coupled to the tape reel spindles by the belts 74, 76 and the drive pulleys 68, 69, as in the above described arrangement. Suitable retaining means may be employed to hold the large reels in place, for example, a retaining disc larger in diameter than the hub member 42 may be removably secured on the end of shaft 25, said shaft being provided with an axial tapped bore 90 to receive a fastening screw engageable through a central opening in such retaining disc.

While a specific embodiment of a large tape reel adaptor for a home tape recorder has been disclosed in the foregoing description, it will be understood that various modifications within the spirit of the invention may occur to those skilled in the art. Therefore it is intended that no limitations be placed in the invention except as defined by the scope of the appended claims.

What is claimed is:

1. In combination with a home tape recorder of the type having a horizontal tape deck provided with horizontally spaced tape feed reel and take-up reel spindles and having a straight rear wall portion adjacent the rear margin of the tape deck, an adaptor plate having a straight front edge in abutment with said straight rear wall portion, depending supporting means secured to said plate and being constructed and arranged to support said plate in a substantially horizontal position rearwardly adjacent said tape deck, a pair of pulleys journalled for independent rotation with respect to each other on said plate, one above the other on a common vertical axis, respective drive pulleys drivingly engaged on said feed reel and take-up reel spindles, respectively flexible belts engaged around and coupling said first-named pulleys to the drive pulleys and being of a length such that they will be maintained in driving tension by the weight of the adaptor plate and the parts mounted thereon when said straight front edge is in abutment with said straight rear wall portion, respective reel hubs disposed one above the other on said common vertical axis, and means connecting said hubs to the respective first-named pulleys.

2. The structure of claim 1, and respective tape idler pulleys journalled on opposite side portions of said adaptor plate.

3. In combination with the structure of claim 1, a switch arm pivoted to one side portion of said adaptor plate, a first tape idler pulley journalled on the free end portion of said switch arm, and a second tape idler pulley journalled on the opposite side portion of said adaptor plate.

References Cited in the file of this patent

UNITED STATES PATENTS

| | | |
|---|---|---|
| 2,732,144 | Jones | Jan. 24, 1956 |
| 2,768,795 | Norton | Oct. 30, 1956 |
| 2,781,982 | Isom | Feb. 19, 1957 |
| 2,854,198 | Lubkin et al. | Sept. 30, 1958 |